(12) United States Patent
Darling et al.

(10) Patent No.: US 10,177,389 B2
(45) Date of Patent: Jan. 8, 2019

(54) ELECTROCHEMICAL DEVICE AND METHOD FOR CONTROLLING CORROSION

(71) Applicant: United Technologies Corporation, Hartford, CT (US)

(72) Inventors: Robert Mason Darling, South Windsor, CT (US); Michael L. Perry, Glastonbury, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 421 days.

(21) Appl. No.: 14/439,679

(22) PCT Filed: Nov. 9, 2012

(86) PCT No.: PCT/US2012/064328
§ 371 (c)(1),
(2) Date: Apr. 30, 2015

(87) PCT Pub. No.: WO2014/074107
PCT Pub. Date: May 15, 2014

(65) Prior Publication Data
US 2015/0288011 A1 Oct. 8, 2015

(51) Int. Cl.
*H01M 4/86* (2006.01)
*H01M 8/04* (2016.01)
(Continued)

(52) U.S. Cl.
CPC ..... *H01M 8/04201* (2013.01); *H01M 8/0258* (2013.01); *H01M 8/0273* (2013.01);
(Continued)

(58) Field of Classification Search
CPC ........... H01M 8/2485; H01M 8/04201; H01M 8/2483; H01M 8/188; H01M 8/0258; H01M 8/24; H01M 4/8605; Y02E 60/528
See application file for complete search history.

(56) References Cited

U.S. PATENT DOCUMENTS 4,277,317 A 7/1981 Grimes et al.
4,400,448 A 8/1983 Einstein
(Continued)

FOREIGN PATENT DOCUMENTS

JP 63040267 2/1988
JP 7-32023 4/1995
(Continued)

OTHER PUBLICATIONS

Skyllas-Kazacos, M., McCann, J., Li, Y., Bao, J., and Tang, A. (2016). The mechanism and modelling of shunt current in the vanadium redox flow battery. ChemistrySelect 2016, 1, 2249-2256.
(Continued)

*Primary Examiner* — Muhammad S Siddiquee
(74) *Attorney, Agent, or Firm* — Carlson, Gaskey & Olds, P.C.

(57) ABSTRACT

An electrochemical device includes a plurality of electrode assemblies that define a plurality of electrochemically active areas. A non-electrically-conductive manifold includes a common manifold passage and a plurality of branch passages that extend, respectively, between the electrochemically active areas and the common manifold passage. Each of the branch passages includes a first region and a second region that differ in surface area.

18 Claims, 4 Drawing Sheets

(51) Int. Cl.
*H01M 8/24* (2016.01)
*H01M 8/04082* (2016.01)
*H01M 8/0273* (2016.01)
*H01M 8/2485* (2016.01)
*H01M 8/18* (2006.01)
*H01M 8/0258* (2016.01)
*H01M 8/2483* (2016.01)

(52) U.S. Cl.
CPC ............ *H01M 8/188* (2013.01); *H01M 8/24* (2013.01); *H01M 8/2483* (2016.02); *H01M 8/2485* (2013.01); *H01M 4/8605* (2013.01); *Y02E 60/528* (2013.01)

(56) References Cited

U.S. PATENT DOCUMENTS

| | | | | |
|---|---|---|---|---|
| 5,972,181 | A * | 10/1999 | Coin | B01D 53/1425 204/242 |
| 6,033,794 | A * | 3/2000 | George | H01M 8/00 429/423 |
| 6,117,297 | A * | 9/2000 | Goldstein | B01D 53/228 204/627 |
| 6,602,626 | B1 * | 8/2003 | Allen | H01M 8/0247 429/425 |
| 8,361,673 | B2 | 1/2013 | Kawashima et al. | |
| 2004/0096715 | A1 * | 5/2004 | Herdtle | H01M 8/04029 429/435 |
| 2009/0023046 | A1 * | 1/2009 | Wang | H01M 4/8605 429/431 |
| 2009/0162732 | A1 * | 6/2009 | Noblet | H01M 8/0273 429/457 |
| 2010/0003545 | A1 | 1/2010 | Home et al. | |
| 2010/0196800 | A1 | 8/2010 | Markoski | |
| 2012/0282501 | A1 | 11/2012 | Haynes | |

FOREIGN PATENT DOCUMENTS

| | | |
|---|---|---|
| JP | 2006134802 | 5/2006 |
| JP | 2011527509 | 10/2011 |
| WO | 8801310 | 2/1988 |

OTHER PUBLICATIONS

The International Preliminary Report on Patentability for PCT Application No. PCT/US2012/064328, dated May 21, 2015.
International Search Report for PCT Application No. PCT/US2012/064328 dated Feb. 6, 2013.
European Search Report for European Patent Application No. 12888128 dated Oct. 23, 2015.

* cited by examiner

ELECTROCHEMICAL DEVICE AND METHOD FOR CONTROLLING CORROSION

BACKGROUND

This disclosure relates to an electrochemical device having enhanced resistance to internal corrosion.

Fuel cells, flow batteries and other electrochemical devices are commonly known and used for generating electric current. An electrochemical device generally includes an anode electrode, a cathode electrode, and a separator layer between the anode and cathode electrodes for generating an electric current in a known electrochemical reaction between reactants. Typically, where ionic-conductive reactants are used, differences in voltage potential at different locations in the electrochemical device cause leakage currents, also known as shunt currents, which debit energy efficiency. Additionally, the shunt current can drive corrosion of components of the electrochemical device.

SUMMARY

An electrochemical device includes a plurality of electrode assemblies that defines a plurality of electrochemically active areas. A non-electrically-conductive manifold includes a common manifold passage and a plurality of branch passages that extend, respectively, between the electrochemically active areas and the common manifold passage. Each of the branch passages includes a first region and a second region that differ in surface area.

Also disclosed is a method for controlling corrosion in an electrochemical device. The method includes providing a reactant fluid flow between a common manifold passage and a plurality of the electrode assemblies. The reactant fluid generates a shunt current that can be supported by self-reactions of the reactant fluid and corrosion reactions of components of the electrochemical device. The corrosion reaction is limited by establishing a tendency toward supporting the shunt current by the self-reaction rather than the corrosion reactions.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
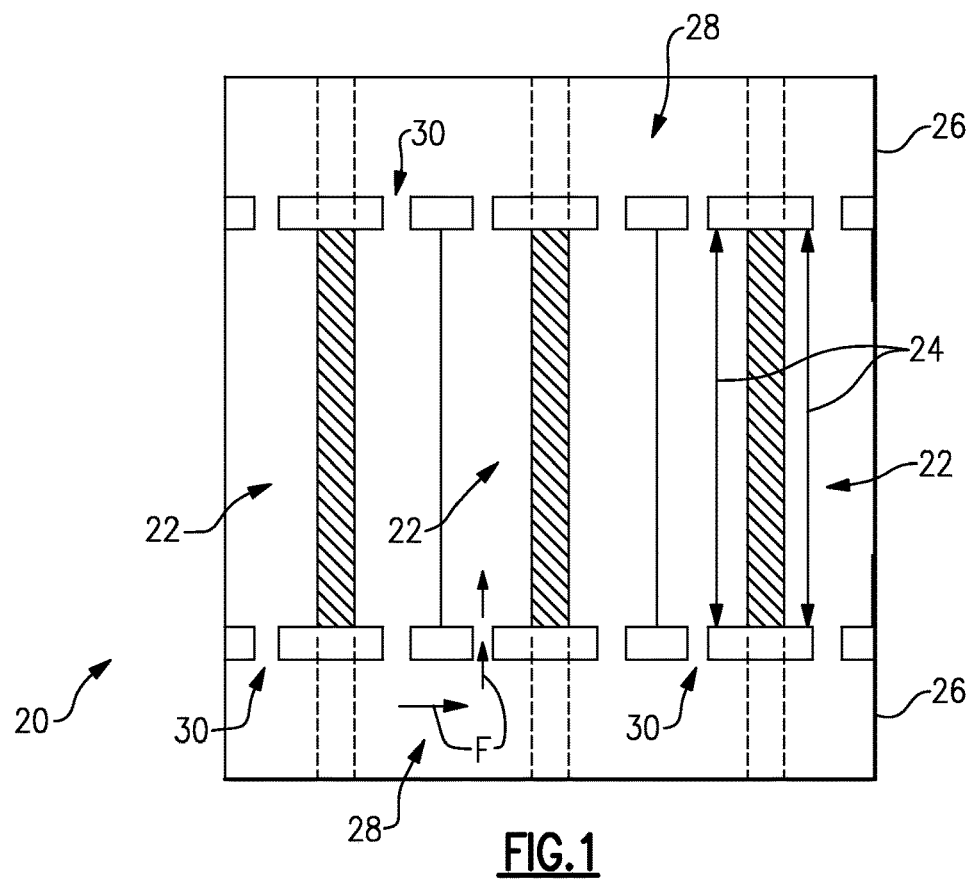
FIG. 1 shows an example electrochemical device.

FIG. 1 schematically shows an example of electrochemical device 20. As will be appreciated, the electrochemical device 20 can be a fuel cell, a flow battery or other type of electrochemical device that utilizes one or more ionic-conductive reactants. As will be described in more detail, the electrochemical device 20 includes features for controlling or limiting corrosion of internal components within the electrochemical device 20, such as carbon- or metal-containing components.

In this example, the electrochemical device 20 includes a plurality of electrode assemblies 22 that are arranged in a stack. The electrode assemblies 22 define a plurality of electrochemically active areas 24. The electrochemically active areas 24 are zones where the reactants participate in oxidation/reduction reactions to generate an electric current. The reactants are provided in this example through a non-electrically-conductive manifold 26. For example, the non-electrically-conductive manifold 26 is a nonconductive polymeric material. The example electrochemical device 20 has two such non-electrically-conductive manifolds 26 that serve to supply and discharge a reactant flow F to and from the electrode assemblies 22. The non-electrically-conductive manifolds 26 can be similar or identical at least with regard to the features described herein.

The non-electrically-conductive manifold 26 includes a common manifold passage 28 through which a reactant is distributed into each of the electrochemically active areas 24. A plurality of branch passages 30, which is outside or partially outside of the electrochemically active areas 24, extends between the electrochemically active areas 24 and the common manifold passage 28.

Figure 2:
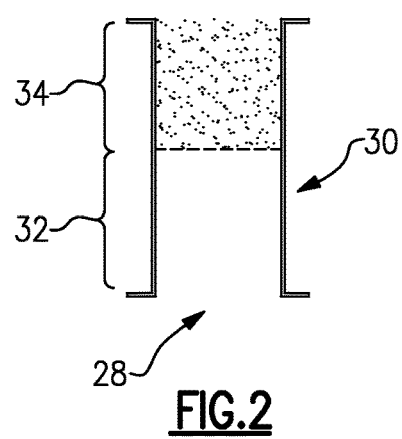
FIG. 2 shows a representative branch passage of the electrochemical device of FIG. 1.

FIG. 2 shows a representative one of the branch passages 30. As shown, the branch passage 30 includes a first region 32 and a second region 34 that differ in surface area, as represented by the different shading of the first region 32 and the second region 34. In one example, the difference in surface area is due to the relative roughness of the walls of the branch passage 30. That is, the walls of the first region 32 are relatively smooth while the walls of the second region 34 are relatively rough.

Fuel cells, flow batteries, and other electrochemical devices, especially those that utilize ionic-conductive reactants, can suffer from inefficiencies due to shunt currents. In some instances, the shunt currents are supported by corrosion reactions that corrode components, especially carbon- or metal-containing components, and ultimately reduce life of the electrochemical device. One approach to addressing shunt currents in electrochemical devices is to increase the length or reduce the width-wise size of branch passages in order to increase the ionic resistance of the pathways for the ionic-conductive reactants. However, increasing the length or reducing the size can debit reactant flow or increase reactant pressure drop and thus adversely impact cell or system performance. The electrochemical device 20 and methodology disclosed herein take a different approach. Rather than limiting resistance, the electrochemical device 20 and methodology herein establish a tendency toward supporting such shunt currents by a self-reaction of the reactants over the corrosion reactions. In other words, the self-reaction of the reactant and the corrosion reactions are competing reactions, and a greater tendency for the self-reaction limits the corrosion reactions. For example, the self-reaction is a change in the oxidation state of the reactant. For a vanadium liquid electrolyte reactant, the self-reaction is the change from $V^{4+}$ to $V^{5+}$ in the positive reactant fluid or $V^{2+}$ to $V^{3+}$ in the negative reactant fluid. A similar self-reaction would be expected for other reactant species, such as those based on bromine, iron, chromium, zinc, cerium, lead or combinations thereof.

Outside of an electrochemically active area, if current density is relatively high and surface area is relatively low in the presence of the reactant, the low surface area provides a relatively low amount of available sites for catalyzing the self-reaction of the reactant. Thus, the competing corrosion reactions are more likely to occur. However, for the same given current density at a higher surface area, there is a greater amount of available surface sites for catalyzing the self-reactions and the tendency shifts to predominantly favor of the self-reaction. This results in a lower amount of corrosion of these solid surfaces.

Thus, in the electrochemical device 20, the first region 32 of the branch channel 30 and the second region 34 that differ in surface area tend to promote or establish a tendency towards supporting the self-reaction of the reactant over the corrosion reaction.

Figure 3:
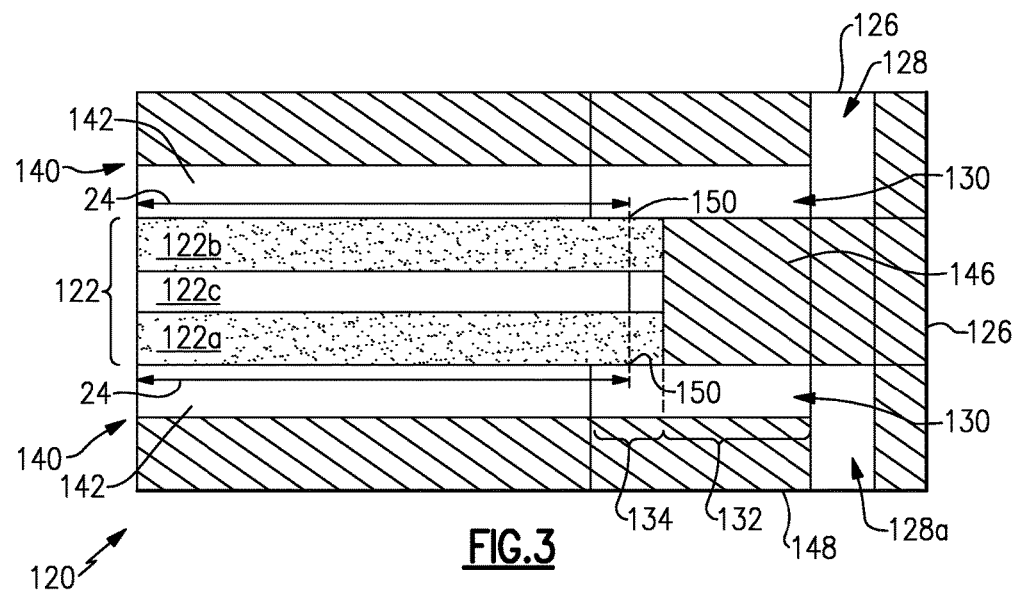
FIG. 3 shows another example electrochemical device.

FIG. 3 illustrates another example of an electrochemical device 120, shown in cross-section. In this disclosure, like reference numerals designate like elements where appropriate and reference numerals with the addition of one-hundred or multiples thereof designate modified elements that are understood to incorporate the same features and benefits of the corresponding elements. The electrode assembly 122 includes a first porous electrode 122a, a second porous electrode 122b and a separator layer 122c there between. The separator layer can be a polymer membrane, such as an ion-exchange membrane for example.

The electrode assembly 122 is arranged between bipolar plates 140. Each of the bipolar plates 140 has channels 142 to convey reactant to or from the respective common manifold passage 128a/128b of the non-electrically-conductive manifolds 126.

Figure 4:
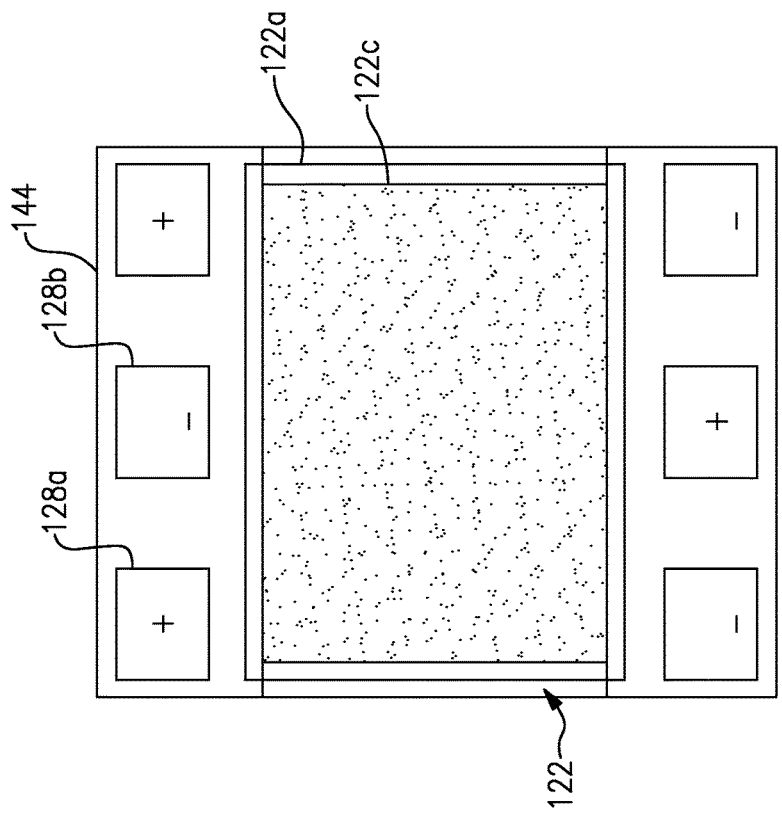
FIG. 4 shows an electrode assembly and a frame used in the electrochemical device of FIG. 3.
Figure 5:
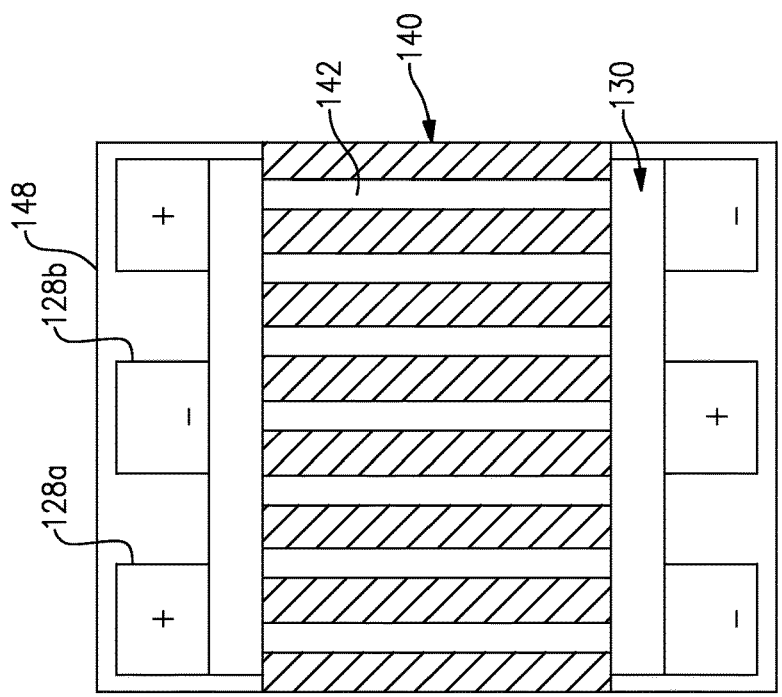
FIG. 5 shows a bipolar plate and a frame used in the electrochemical device of FIG. 3.

Referring also to FIGS. 4 and 5, with continuing reference to FIG. 3, the electrode assembly 122 is mounted in a non-electrically-conductive frame 144 with a plurality of openings that form part of the non-electrically-conductive manifold 126 and common manifold passages 128a/128b. Although the disclosed example has six manifold holes on each part in FIGS. 4 and 5, fewer can alternatively be used, such as four (one + and one − on each end for inlets and outlets). A seal 146 is provided around the perimeter of the electrode assembly 122 to limit escape of reactants. The seal 146 can also function as means to integrate the electrodes and separator assembly, a membrane-electrode assembly (MEA), for example. Similarly, each of the electrically-conductive bipolar plates 140 is mounted in a non-conductive frame 148 with a plurality of openings that form part of the non-electrically-conductive manifold 126 and common manifold passage 128a/128b.

Each of the first porous electrode 122a and the second porous electrode 122b spans over an area that is larger than the separator layer 122c, as represented by overhang portions 150 that are outside of the electrochemically active area 24. The areas of the first porous electrode 122a and the second porous electrode 122b are also larger than the bipolar plates 140. The branch passages 130 include the first region 132 that is bounded by the non-conductive frame 148 and the seal 146. The branch passages 130 may operate as either inlets or exits to or from the channels 142 of the bipolar plates 140. The surfaces of the non-conductive frame 148 and the non-conductive seal 146 are relatively smooth. The second region 134 is bounded by the non-conductive frame 148 and the first or second porous electrode 122a/122b, which are conductive. The first and second porous electrodes 122a/122b thus provide a relatively greater surface area than the smooth walls of the non-conductive frame 148 and the seal 146. Thus, the overhang portions 150 provide regions with high surface areas outside of the electrochemically active areas 24 to serve as sources or sinks for the shunt currents, where these shunt current can be supported with the self-reactions rather than the corrosion reactions.

Figure 7:
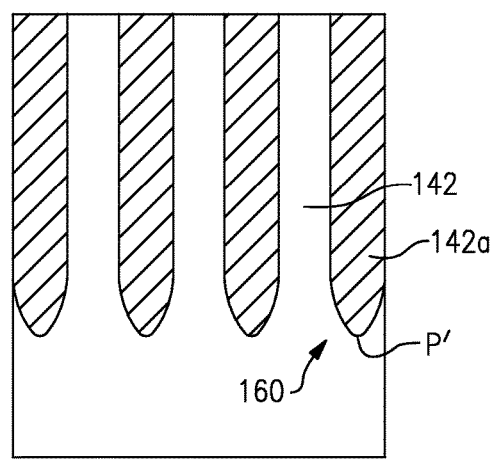
FIG. 7 shows another example of bipolar plate channel walls that have tapered ends.
Figure 8:
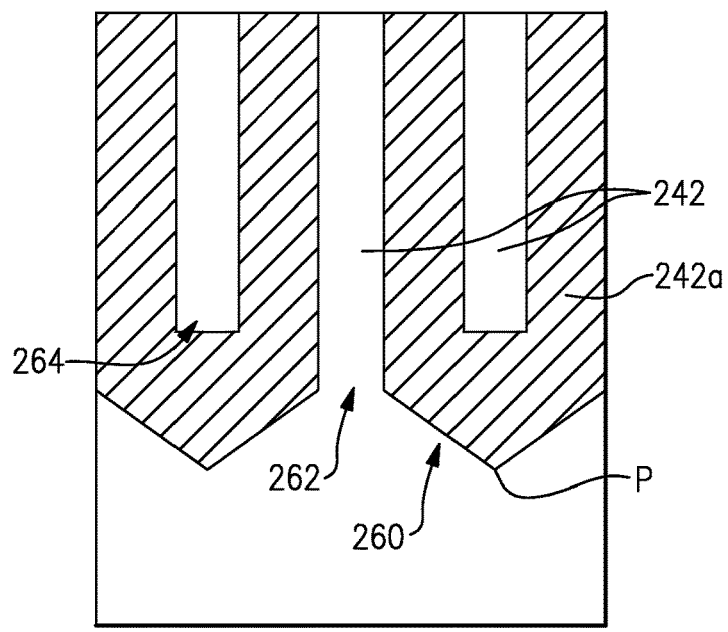
FIG. 8 shows another example of bipolar plate channel walls that have tapered ends.
Figure 6:
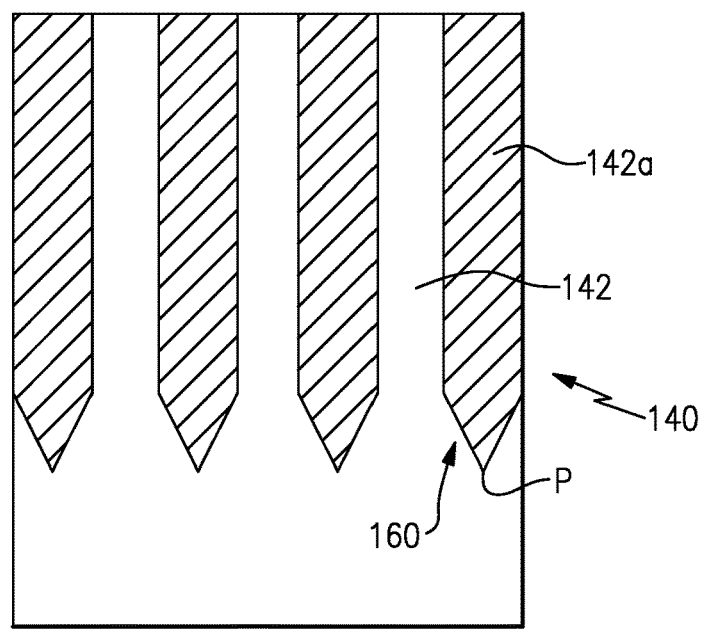
FIG. 6 shows bipolar plate channel walls that have tapered ends.

In a further example shown in FIG. 6, the channels 142 of the bipolar plate 140 extend between channel walls 142a. Each of the channel walls 142a has a tapered end 160. In this example, the tapered end 160 tapers to a point, P. Alternatively, the tapered ends 160 can be rounded as shown in FIG. 7. In another alternative shown in FIG. 8, the channels 242 are interdigitated, with alternating open ends 262 and closed ends 264. The tapered ends 160/260 further facilitate establishing the tendency toward the self-reaction of the reactant over the corrosion reactions. The self-reaction of reactants can be transport limited. The tapered ends 160/260 of the channel walls 142a permit the reactant to continually move at the inlet of the channels 142 and thereby disfavor the self-reaction of the reactant over the corrosion reactions.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. An electrochemical device comprising:
   a plurality of electrode assemblies defining a plurality of electrochemically active areas;
   a non-electrically-conductive manifold including a common manifold passage to transport ionic-conductive fluids, wherein the ionic-conductive fluids contain one or more reactants that readily undergo oxidation and reduction reactions that result in different oxidation states and enable the storage of energy; and
   a plurality of branch passages that extend, respectively, between the plurality of electrochemically active areas and the common manifold passage, each of the plurality of branch passages including a first region and a second region that differ in surface area.

2. The electrochemical device as recited in claim 1, wherein each of the plurality of electrode assemblies includes a first porous electrode, a second porous electrode and a separator layer between the first porous electrode and the second porous electrode, wherein the first porous electrode and the second porous electrode each span over an area that is larger than the separator layer.

3. The electrochemical device as recited in claim 2, wherein the first porous electrode and the second porous electrode include respective overhang portions that extend beyond a side of the separator layer, each of the overhang portions bounding the second region of a respective one of the plurality of branch passages but not bounding the first region.

4. The electrochemical device as recited in claim 1, wherein the first region and the second region differ in wall surface roughness.

5. The electrochemical device as recited in claim 1, wherein the second region is partially bounded by an electrically-conductive surface that is outside of the plurality of electrochemically active areas.

6. The electrochemical device as recited in claim 5, wherein the first region is bounded by non-conductive polymeric walls.

7. The electrochemical device as recited in claim 1, further comprising a bipolar plate that includes a plurality of channels that are fluidly connected with the plurality of branch passages, the plurality of channels being in the plurality of electrochemically active areas.

8. The electrochemical device as recited in claim 7, wherein the plurality of channels run between channel walls and each of the channel walls includes a tapered end.

9. The electrochemical device as recited in claim 8, wherein the tapered end tapers to a point.

10. The electrochemical device as recited in claim 8, wherein the tapered end tapers to a rounded end.

11. The electrochemical device as recited in claim 8, wherein the plurality of channels are interdigitated channels.

12. The electrochemical device as recited in claim 7, wherein the first porous electrode and the second porous electrode each span over an area that is larger than the bipolar plate.

13. The electrochemical device as recited in claim 2, further comprising a seal around the perimeter of the electrode assembly, wherein the seal integrates the electrodes and the separator layer in a membrane-electrode assembly.

14. The electrochemical device as recited in claim 3, wherein the overhang portions serve as sources or sinks for shut currents of the ionic-conductive fluids.

15. The electrochemical device as recited in claim 4, wherein the first region is relatively smooth compared to the second region.

16. The electrochemical device as recited in claim 11, wherein the interdigitated channels have alternating open ends and closed ends.

17. The electrochemical device as recited in claim 1, wherein the electrochemical device is a flow battery.

18. The electrochemical device as recited in claim 1, wherein the ion conductive fluids are vanadium liquid electrolytes.

* * * * *